(12) United States Patent
Pierick et al.

(10) Patent No.: US 11,261,786 B2
(45) Date of Patent: Mar. 1, 2022

(54) CONTINUOUS SLANTED CELL SEPTUM

(71) Applicant: ROHR, INC., Chula Vista, CA (US)

(72) Inventors: David Edward Pierick, San Diego, CA (US); Richard Scott Alloway, San Diego, CA (US); Jose S. Alonso-Miralles, Chula Vista, CA (US); Hwa-Wan Kwan, Chula Vista, CA (US); Raymond R. Listak, Chula Vista, CA (US); Christopher Charles Koroly, Spring Valley, CA (US)

(73) Assignee: ROHR, INC., Chula Vista, CA (US)

( * ) Notice: Subject to any disclaimer, the term of this patent is extended or adjusted under 35 U.S.C. 154(b) by 714 days.

(21) Appl. No.: 16/056,209

(22) Filed: Aug. 6, 2018

(65) Prior Publication Data

US 2020/0040818 A1 Feb. 6, 2020

(51) Int. Cl.
*F02C 7/045* (2006.01)
*B32B 3/12* (2006.01)

(52) U.S. Cl.
CPC ............... *F02C 7/045* (2013.01); *B32B 3/12* (2013.01); *B32B 2307/102* (2013.01); *F05D 2230/232* (2013.01); *F05D 2230/54* (2013.01); *F05D 2240/14* (2013.01); *F05D 2250/131* (2013.01); *F05D 2250/191* (2013.01); *F05D 2260/96* (2013.01)

(58) Field of Classification Search
CPC ..... F02C 7/045; B32B 3/21; B32B 2307/102; F05D 2230/232; F05D 2230/54; F05D 2240/14; F05D 2250/131; F05D 2250/191; F05D 2260/96
USPC ....................................................... 181/222
See application file for complete search history.

(56) References Cited

U.S. PATENT DOCUMENTS

| | | | |
|---|---|---|---|
| 3,831,710 A | 8/1974 | Wirt | |
| 5,785,919 A | 7/1998 | Wilson | |
| 6,725,541 B1 * | 4/2004 | Holme | F02K 1/70 29/889.21 |
| 8,047,329 B1 * | 11/2011 | Douglas | G10K 11/172 181/292 |

(Continued)

FOREIGN PATENT DOCUMENTS

| | | | |
|---|---|---|---|
| EP | 3206203 | 8/2017 | |
| EP | 3206203 A2 * | 8/2017 | G10K 11/28 |

OTHER PUBLICATIONS

EPO, Partial European Search Report dated Oct. 1, 2020 in EP Application No. 19189832.9.

(Continued)

*Primary Examiner* — Forrest M Phillips
(74) *Attorney, Agent, or Firm* — Snell & Wilmer L.L.P.

(57) ABSTRACT

A panel for attenuating noise is disclosed comprising a face skin having a first inner surface, a base skin having a second inner surface, a cellular core connected to and forming a plurality of cells between the face skin and the base skin, wherein the cellular core is defined by a cell structure having a plurality of cell walls extending between the face skin and the base skin defining each of the plurality of cells and a septum disposed within each of the plurality of cells, the septum defining an upper chamber proximate the face skin and a lower chamber proximate the base skin, wherein the face skin comprises a plurality of perforations fully through the face skin and in fluid communication with the upper chamber.

20 Claims, 7 Drawing Sheets

(56) References Cited

U.S. PATENT DOCUMENTS

| | | | |
|---|---|---|---|
| 9,643,392 B2 | 5/2017 | Butler et al. | |
| 9,708,930 B2 | 7/2017 | Koroly | |
| 9,761,216 B2 * | 9/2017 | Nampy | G10K 11/172 |
| 9,764,818 B2 | 9/2017 | Nampy et al. | |
| 10,309,305 B2 * | 6/2019 | Biset | F02C 7/045 |
| 2011/0100747 A1 * | 5/2011 | Hoetzeldt | G10K 11/16 |
| | | | 181/290 |
| 2015/0367953 A1 * | 12/2015 | Yu | F02C 7/24 |
| | | | 181/222 |

OTHER PUBLICATIONS

European Patent Office, European Search Report dated Jun. 26, 2020 in Application No. 19189832.9.

* cited by examiner

CONTINUOUS SLANTED CELL SEPTUM

FIELD

The disclosure relates generally to an acoustic panel and, more particularly, to an acoustic panel for attenuating noise in a gas turbine engine.

BACKGROUND

A gas turbine engine may include an acoustic panel for attenuating noise generated during engine operation. A typical acoustic panel includes a honeycomb core connected between a solid face skin and a perforated face skin. This honeycomb core includes a plurality of resonating cavities. The honeycomb core may have a thickness or height that tunes the resonating cavities to a specific target frequency of the noise to be attenuated. As a result, sound waves reflected by the acoustic panel may interact with sound waves traveling relatively toward the panel. The honeycomb core often includes a middle layer of porous material called a septum and by altering properties of the core and septum design the resulting cavities may act as Helmholtz resonators thereby attenuating noise. Various honeycomb core designs providing acoustic attenuation optimized across particular frequencies have been developed and commercialized. However, the relatively complex geometry of cores tend to benefit from particularized manufacturing processes for the attenuation band thereby tending to increase manufacturing costs.

SUMMARY

In various embodiments, a panel for attenuating noise is disclosed comprising a face skin having a first inner surface, a base skin having a second inner surface, a cellular core connected to and forming a plurality of cells between the face skin and the base skin, wherein the cellular core is defined by a cell structure having a plurality of cell walls extending between the face skin and the base skin defining each of the plurality of cells and a septum disposed within each of the plurality of cells, the septum defining a first chamber proximate the face skin and a second chamber proximate the base skin, the septum continuously slanted to define a plane intersecting the face skin and the base skin at a non-orthogonal angle, wherein the face skin comprises a plurality of perforations fully through the face skin and in fluid communication with the upper chamber.

In various embodiments, the septum comprises a perforation through a face having a perforated area, wherein the first chamber and the second chamber are in fluid communication via the perforation. In various embodiments, the cell structure is at least one of hexagonal, pentagonal, triangular, circular, oblate, oval, elliptical, or lenticular. In various embodiments, the perforated area is between 1% and 25% of the face. In various embodiments, the cell structure is a quadrilateral cell structure defining a cell having a first cell wall, a second cell wall, a third cell wall, and a fourth cell wall each cell wall defining nodes at the intersections thereof, wherein the septum extends across the cell from a node at the first inner surface to an opposing node at the second inner surface. In various embodiments, the septum comprises a metal foil of a steel, a stainless steel, a titanium, a titanium alloy, a nickel alloy, an aluminum, or an aluminum alloy. In various embodiments, the metal foil comprises a first upper tab, a second upper tab, a first lower tab, and a second lower tab. In various embodiments, the first upper tab is coupled to the first cell wall, the second upper tab is coupled to the second cell wall, the first lower tab is coupled to the third cell wall, and the second lower tab is coupled to the fourth cell wall. In various embodiments, a mesh may be coupled to the face of the septum across the perforation.

In various embodiments a gas turbine engine is disclosed comprising a compressor section configured to compress a gas, a combustor section aft of the compressor section configured to combust the gas, a turbine section aft of the combustor section configured to drive the compressor section, and a panel for attenuating noise comprising a face skin having a first inner surface, a base skin having a second inner surface, a cellular core connected to and forming a plurality of cells between the face skin and the base skin, wherein the cellular core is defined by a cell structure having a plurality of cell walls extending between the face skin and the base skin defining each of the plurality of cells and a septum disposed within each of the plurality of cells, the septum defining a first chamber proximate the face skin and a second chamber proximate the base skin, wherein the face skin comprises a plurality of perforations fully through the face skin and in fluid communication with the upper chamber In various embodiments, the septum comprises a perforation through a face having a perforated area, wherein the first chamber and the second chamber are in fluid communication via the perforation. In various embodiments, the cell structure is at least one of hexagonal, pentagonal, triangular, circular, oblate, oval, elliptical, or lenticular. In various embodiments, the perforated area is between 1% and 25% of the face. In various embodiments, the cell structure is a quadrilateral cell structure defining a cell having a first cell wall, a second cell wall, a third cell wall, and a fourth cell wall each cell wall defining nodes at the intersections thereof, wherein the septum extends across the cell from a node at the first inner surface to an opposing node at the second inner surface. In various embodiments, the septum comprises a metal foil of a steel, a stainless steel, a titanium, a titanium alloy, a nickel alloy, an aluminum, or an aluminum alloy. In various embodiments, the metal foil comprises a first upper tab, a second upper tab, a first lower tab, and a second lower tab. In various embodiments, the first upper tab is coupled to the first cell wall, the second upper tab is coupled to the second cell wall, the first lower tab is coupled to the third cell wall, and the second lower tab is coupled to the fourth cell wall. In various embodiments, a mesh may be coupled to the face of the septum across the perforation.

In various embodiments, a method for a method of manufacturing a panel for attenuating noise is disclosed. The method may comprise laying a first edge of a metal foil across an opening of a cell of a cellular core and coupling the first edge to a node of the cell at the opening. The method may include driving a second edge of the metal foil through the cell, inserting a die through a first end of the cell, and inserting an anvil through a second end of the cell. The method may include forming a face of a septum between the intersection of the die and the anvil and forming an upper tab and a lower tab in response to the action of the die and the anvil.

In various embodiments, the method includes coupling the upper tab to a first cell wall of the cell and coupling the lower tab to a second cell wall of the cell and perforating the face of the septum. The method may include coupling a face skin to the cellular core at the first end of the cell, perforating the face skin, and coupling a base skin to the cellular core at the second end of the cell.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
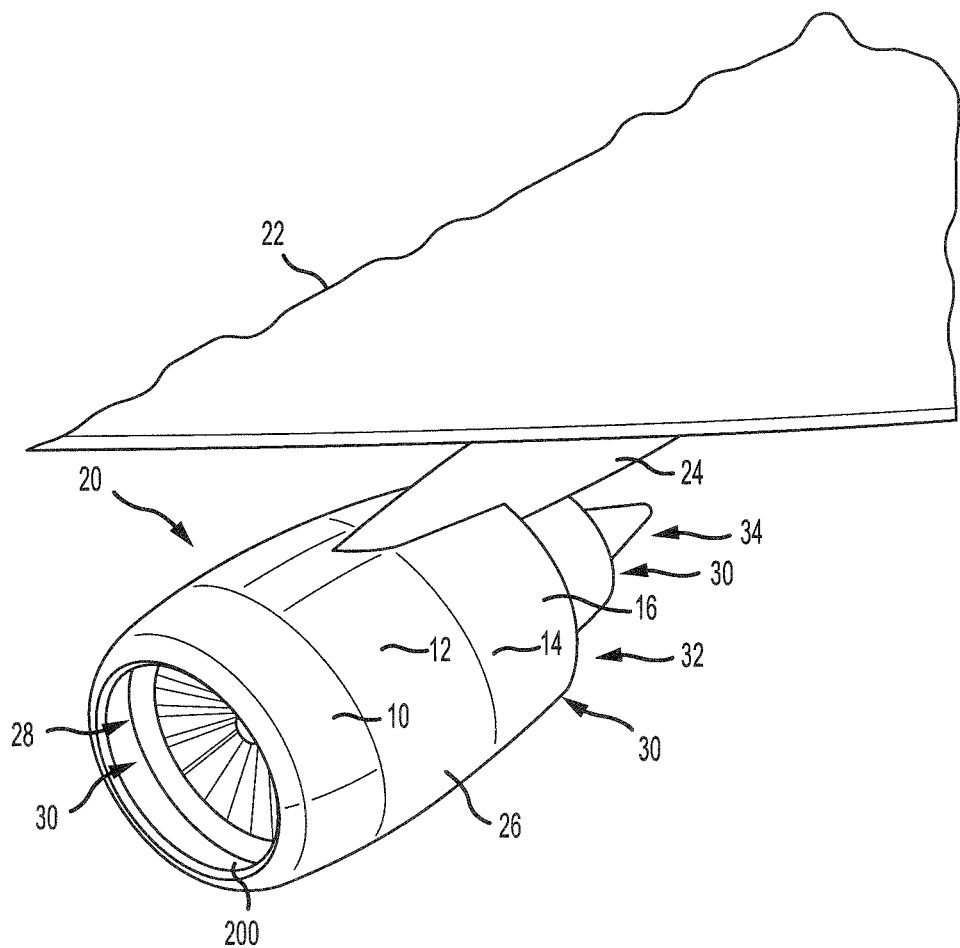
FIG. 1 illustrates an exemplary gas turbine engine having acoustically treated areas, in accordance with various embodiments.

In various embodiments and with reference to FIG. 1, a gas turbine engine 20 is provided. Gas turbine engine 20 may be a two-spool turbofan that generally incorporates a fan section 10, a compressor section 12 configured to compress a gas, a combustor section 14 aft of the compress section and configured to combust the gas, and a turbine section 16 aft of the combustor section configured to drive the compressor section. Although gas turbine engine 20 is depicted as a turbofan herein, it should be understood that the concepts described herein are not limited to use with turbofans as the teachings may be applied to other types of turbine engines including three-spool architectures. Gas turbine engine 20 is mounted on an aircraft wing 22 by a pylon 24. Gas turbine engine 20 includes a surrounding engine nacelle 26 having an inlet 28, a fan exhaust 32, and a turbine exhaust 34. Areas of the engine nacelle 26, such as any of the inlet 28, fan exhaust 32, and turbine exhaust 34, may include acoustically treated areas 30 in the form of an acoustic panel or liner 200. Acoustic liner 200 may reduce noise caused by high speed airflow such as through inlet 28 or fan exhaust 32. Acoustic liner 200 may comprise an entirely metallic construction capable of withstanding exhaust airflow temperatures of turbine exhaust 34 without structural degradation and thereby may reduce noise caused by high speed high temperature exhaust airflow through turbine exhaust 34.

Figure 2:
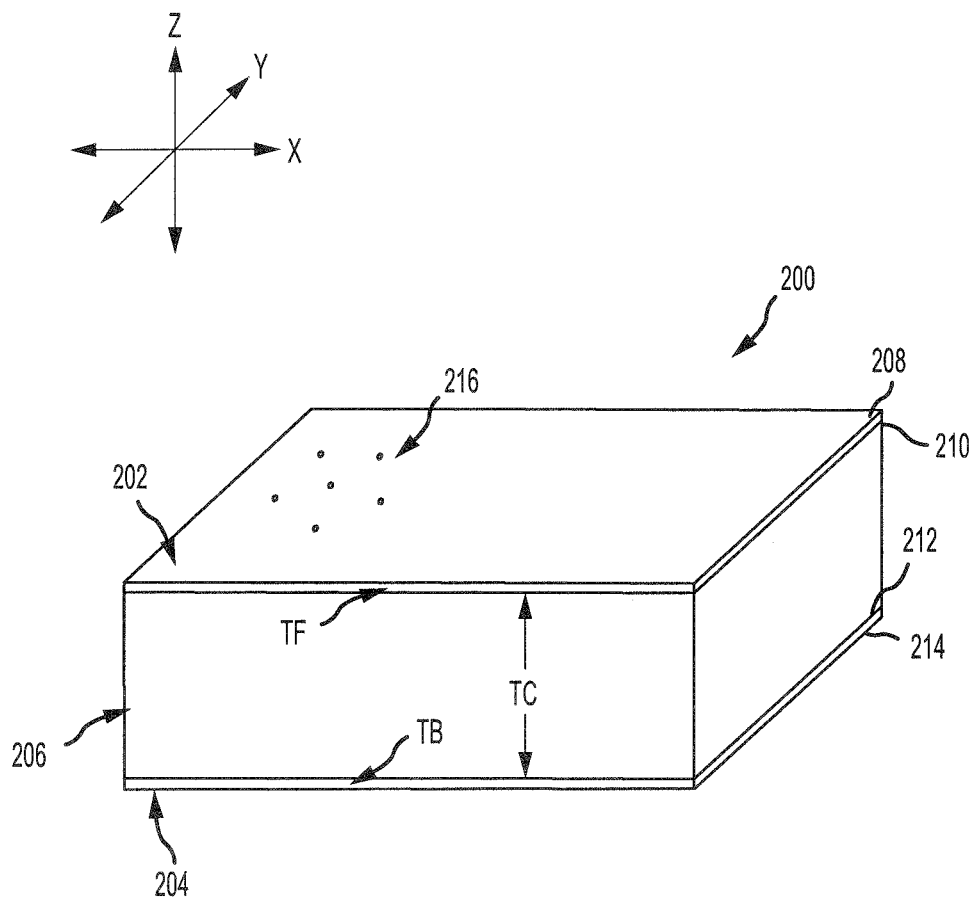
FIG. 2 illustrates perspective block diagram of an acoustic liner, in accordance with various embodiments.

According to various embodiments and with reference to FIG. 2, an acoustic liner 200 is illustrated in perspective block diagram view in accordance with various embodiments. Acoustic liner 200 may be configured to attenuate noise generated by an aircraft propulsion system such as, for example, a turbofan or turbojet or other engine such as gas turbine engine 20. Acoustic liner 200 may be configured with a nacelle (such as nacelle 26) or an inner fixed structure of a gas turbine engine. In various embodiments, acoustic liner may be configured with another component or structure of an aircraft such as, for example, pylon 24, wing 22, or a fuselage of an aircraft. In this regard, acoustic liner 200 may be configured to attenuate aircraft related noise other than from an aircraft propulsion system such as gas turbine engine 20. Furthermore, it will be appreciated that acoustic liner 200 may be alternatively configured to attenuate noise in other than aircraft applications such as, for example, industrial gas paths, high speed gas discharge, machine rooms, and/or the like.

The acoustic liner 200 extends laterally within an x-y plane defined by an x-axis and a y-axis. For ease of illustration, the x-y plane is shown generally as a flat plane with acoustic liner 200 extending vertically along the z-axis defining a liner thickness. In various embodiments, the acoustic liner 200 may comprise one of a curved geometry, a compound-curved geometry, an angular geometry, an undulating geometry, and/or any other suitable geometry. Therefore, the x-y plane and, thus, acoustic liner 200 may describe closed or open structures of a cylindrical, conical, frustoconical, rectilinear, prismatic, and/or other suitable geometry. Acoustic liner 200 comprises a first skin 202 (e.g. a face skin) which comprises a plurality of perforations 216, a second skin 204 (e.g., a base skin or backing skin), and a cellular core 206 sandwiched by and extending between the face skin 202 and the base skin 204. Cellular core 206 may be welded, brazed, fused, adhered or otherwise bonded to the face skin 202 and/or the base skin 204. In various embodiments, the cellular core 206 may be mechanically fastened to the face skin 202 and/or the base skin 204. In various embodiments, a cellular core such as cellular core 206, a face skin, and/or a base skin may comprise one of a metal, an alloy, a steel, a stainless steel, an aluminum, an aluminum alloy, a nickel, a nickel alloy, a titanium, a titanium alloy, a thermoplastic material, a thermoset material, a composite material, a carbon composite material, a polymer, a ceramic, or a paper material.

Face skin 202 may extend between an outer surface 208 and an inner surface 210 and has a face thickness TF (along the z-axis) defined therebetween. In like regard, base skin 204 extends between inner surface 212 and outer surface 214 and has a base thickness TB (along the z-axis) defined therebetween. Face skin 202 and base skin 204 are coupled to cellular core 206 along inner surface 210 and inner surface 212 respectively. Inner surface 210 and inner surface 212 define a core thickness TC of cellular core 206 which extends (along the z-axis) therebetween. In various embodiments the core thickness TC may be between 0.25 [0.63 cm] in and 4 in [10.2 cm], or may be between 0.25 [0.63 cm] in and 2.0 in [5.1 cm], or may be between 1.0 in [2.5 cm] and 1.5 in [3.8 cm]. Perforations 216 extend fully through face skin 202 and may extend generally vertically (along the z-axis) between the outer surface 208 and the inner surface 210. In this regard, an interior volume (e.g., a cell core or cavity) of cellular core 206 may be in fluid communication via perforations 216.

Figure 3:
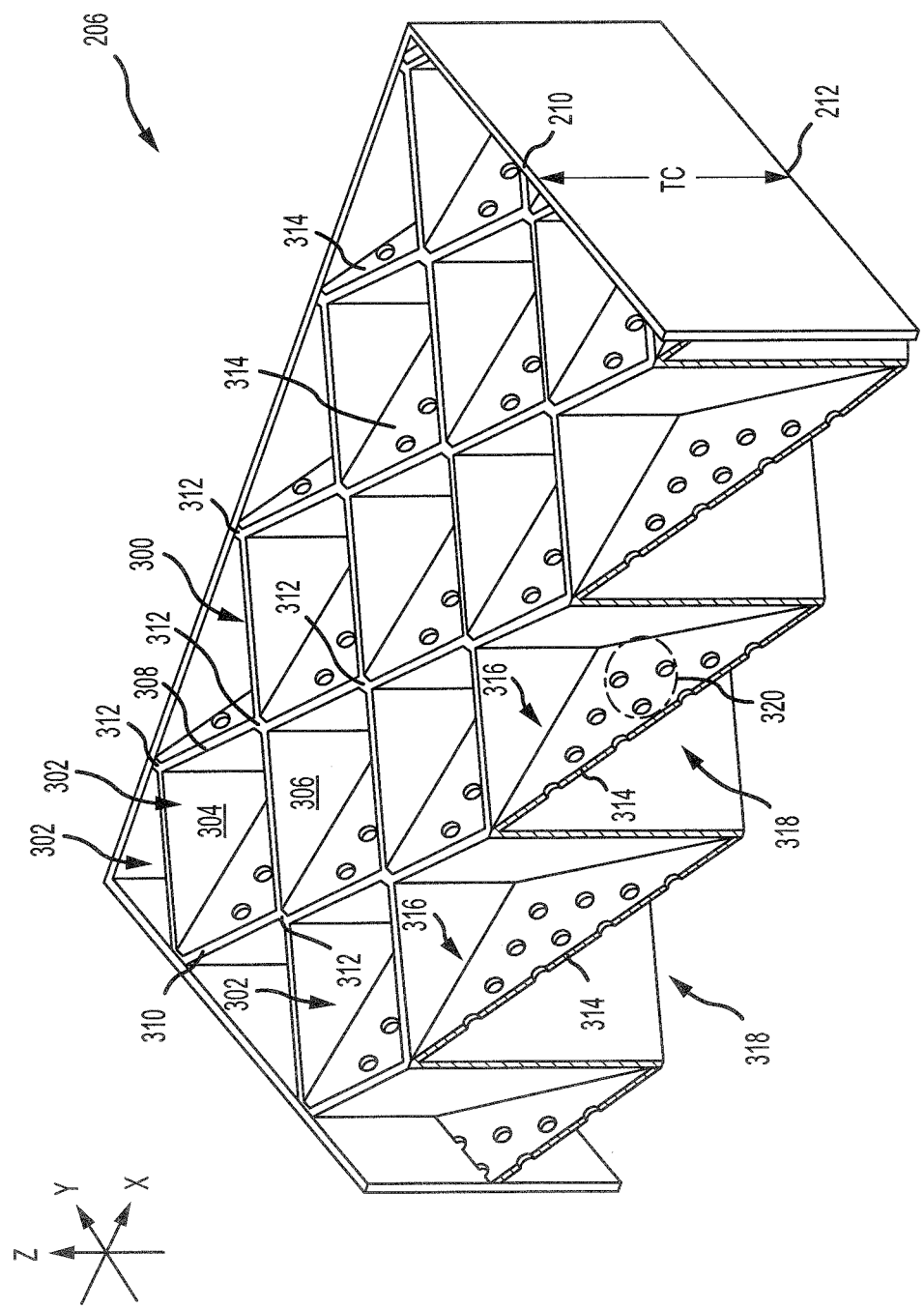
FIG. 3 illustrates a cellular core of an acoustic liner, in accordance with various embodiments.

With additional reference to FIG. 3, cellular core 206 of acoustic liner 200 is illustrated in perspective section between inner surface 210 and inner surface 212. Cellular core 206 has a cell structure 300 defining cells 302 between cell wall 304, cell wall 306, cell wall 308, and cell wall 310. Although cell structure 300 is illustrated as a quadrilateral (e.g., rectangular) cell structure, it is understood that cell structure 300 may define any number of useful cell structures such as, for example, one of a hexagonal, pentagonal, or triangular cell structure (as viewed in section through the x-y plane) including any number of additional cell walls. Furthermore, the cell structure 300 is not limited to polygonal geometries and may comprise one of circular, oblate, oval, elliptical, or lenticular geometries. In various embodiments, the area of a cell 302 of cell structure 300 in section through the x-y plane may be between 0.125 in-sq [0.806 cm-sq] and 4.0 in-sq [25.8 cm-sq], or may be between 0.25 in-sq [1.6 cm-sq] and 3.0 in-sq [19.4 cm-sq], or may be between 1.0 in-sq [6.5 cm-sq] and 2.0 in-sq [12.9 cm-sq]. In various embodiments, cellular core 206 comprises one of a metal, an alloy, a steel, a stainless steel, a titanium, a titanium alloy, a nickel alloy, an aluminum, or an aluminum alloy.

Each of the cell walls (304-310) may extend vertically (along the z-axis) and be oriented substantially perpendicular to the face skin 202 and the base skin 204. However, in various embodiments, one or more of the walls (304-310) may be offset from the face skin 202 and/or base skin 204 by a non-ninety degree angle such as, for example, an acute angle or an obtuse angle. Cell structure 300 includes a plurality of nodes 312 wherein each node is defined by an intersection (along the z-axis) between the cell walls (304-310). Each of the cells 302 of cell structure 300 include a septum 314 extending between the cell walls (304-310) and diagonally across the core thickness TC between opposing nodes at the inner surface 210 and the inner surface 212. In this regard, the septums 314 divide each of the cells 302 into an upper chamber 316 (i.e., a first chamber) and a lower chamber 318 (i.e., a second chamber) of approximately equivalent volume. Upper chamber 316 an lower chamber 318 are in fluid communication via perforations 320 through septum 314. The septum 314 is continuously slanted thereby defining a plane intersecting the face skin and the base skin. Septum 314 may have a slant angle described between the septum and a plane of the face skin and/or base skin, for example, a septum having a slant angle of 0° would extend parallel to the face skin whereas a septum having a slant angle of 90° would extend orthogonal to the face skin. In various embodiments, the slant angle may be between 1° and 89°, or may be between 10° and 70°, or may be between 15° and 60°. In various embodiments, a septum such as septum 314 may comprise one of a metal, an alloy, a steel, a stainless steel, an aluminum, an aluminum alloy, a nickel, a nickel alloy, a titanium, a titanium alloy, a thermoplastic material, a thermoset material, a composite material, a carbon composite material, a polymer, a ceramic, or a paper material.

Figure 4:
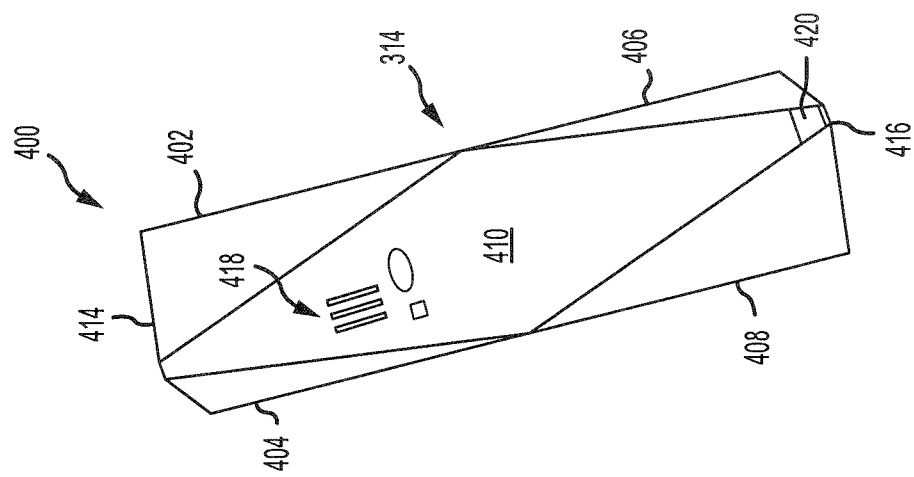
FIG. 4 illustrates a metal foil disposed within a cell, in accordance with various embodiments.
Figure 4:
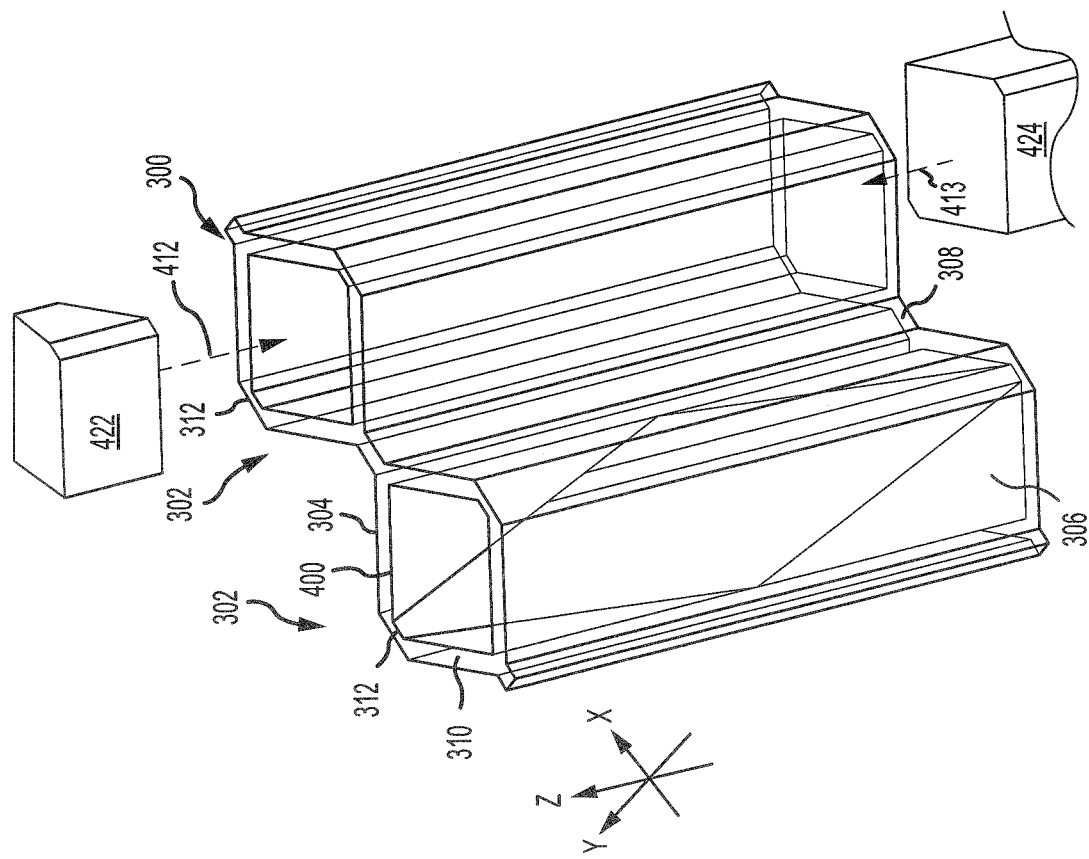

In various embodiments and with additional reference to FIG. 4, septum 314 comprises a metal ribbon or metal foil 400 disposed within a cell 302. Adjoining cells 302 of cell structure 300 are shown in FIG. 4, for illustrative purpose, with translucent cell walls (304-310). Upper edge 414 (i.e. a first edge) of metal foil 400 is laid across the opening of cell 302 and coupled (such as, for example, by welding) at the opening to node 312. The lower edge 416 (i.e., a second edge) is driven or pulled downward (along the negative z-axis) through cell 302. In various embodiments, a die 422 is inserted through a first end of cell 302 along arrow 412 and a corresponding anvil 424 is inserted through a second end of cell 302 along arrow 413 shaping metal foil 400 to form face 410 of septum 314 between the intersection of the die 422 an anvil 424. In various embodiments, the action of the die 422 and anvil 424 form first upper tab 402, second upper tab 404, first lower tab 406, and second lower tab 408. In response to the action of the die 422, first upper tab 402 is driven into contact with cell wall 304 (i.e., a first cell wall) and second upper tab is driven into contact with cell wall 310 (i.e., a second cell wall). In like regard, first lower tab 406 is driven into contact with cell wall 308 (i.e., a third cell wall) and second lower tab 408 is driven into contact with cell wall 306 (i.e., a fourth cell wall) by the anvil 424.

In various embodiments, each of tabs (402-406) may be bonded, welded, or brazed to the corresponding cell wall (304-310) thereby forming septum 314 dividing upper chamber 316 and lower chamber 318 and inhibiting fluid communication therebetween. In various embodiments, face 410 may be punctured (e.g., mechanically or laser drilled, punctured, chemically etched, or any other suitable method known to those skilled in the art) to form perforations 320 or any other suitable perforation 418 through face 410 such as, for example, elliptical perforations, rectangular perforations, slits, or a corner notch 420. In various embodiments, perforations such as perforations 320 may be arranged in a pattern or may be placed arbitrarily across a face such as face 410 to define a perforated area of the face. The perforated area of face 410 may be between 1% and 25% of face 410, or may be between 5% and 20% of face 410, or may be between 8% and 18%. Stated another way, the perforated area may define a percentage of open area through the face between the chambers. In various embodiments, metal foil 400 comprises one of a metal, an alloy, a steel, a stainless steel, a titanium, a titanium alloy, a nickel alloy, an aluminum, or an aluminum alloy. In various a metal foil such as metal foil 400 may comprise a woven metal mesh.

Figure 5:
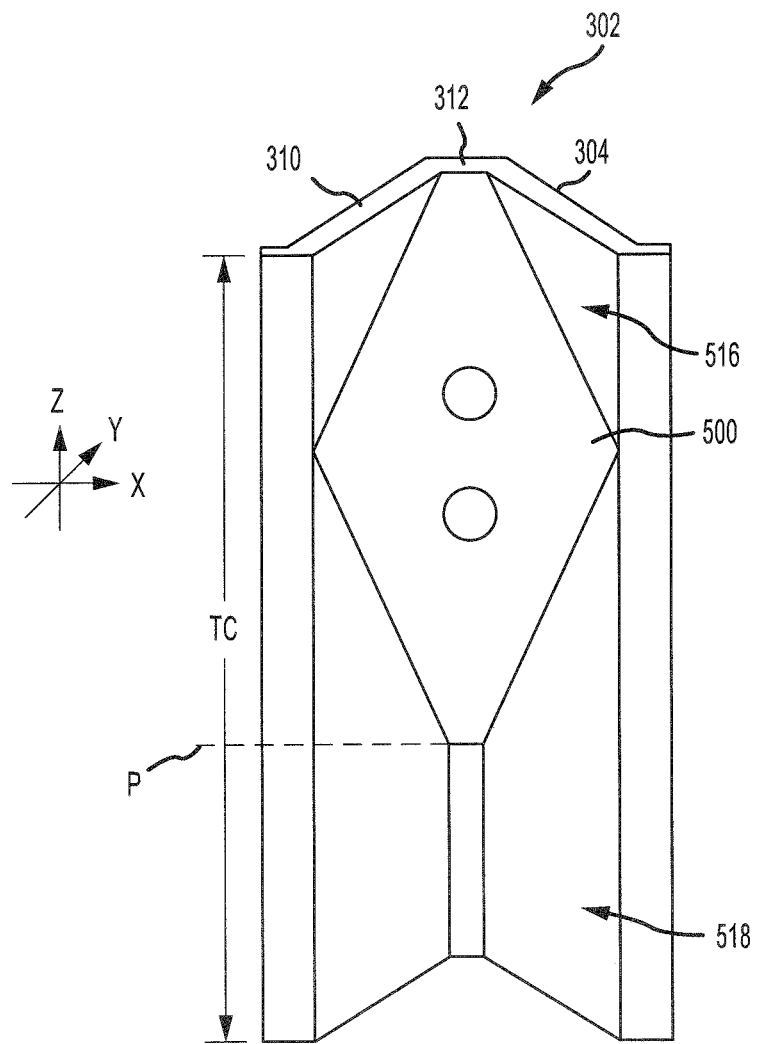
FIG. 5 illustrates a septum, in accordance with various embodiments.

In various embodiments, and with additional reference to FIG. 5, a septum 500 having features, geometries, construction, materials, manufacturing techniques, and/or internal components similar to septum 314 is illustrated within a cell 302 of cell structure 300. Cell walls 310 and 304 are illustrated and cell walls 306 and 308 are cut away for detail. Septum 500 extends from node 312 at inner surface 210 across the cell to a point P along the opposing node located partially across the core thickness TC thereby dividing cell 302 into an upper chamber 516 and a lower chamber 518 each having a relatively unequal volume. Septum 500 may be formed by altering the face and/or insertion depth of the die 422 and/or anvil 424 (along arrows 412, 413) through each end of cell 302 and thereby the point of intersection within core thickness TC. In this regard, septum 500 may be placed within cell 302 at any depth (relative to the z-axis) to configure the upper chamber to have a greater volume than the lower chamber or the lower chamber to have a greater volume than the upper chamber.

Figure 6:
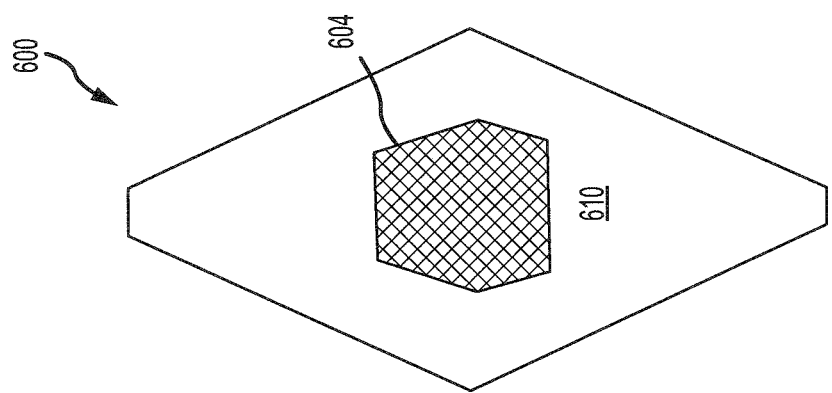
FIG. 6 illustrates a septum, in accordance with various embodiments.
Figure 6:
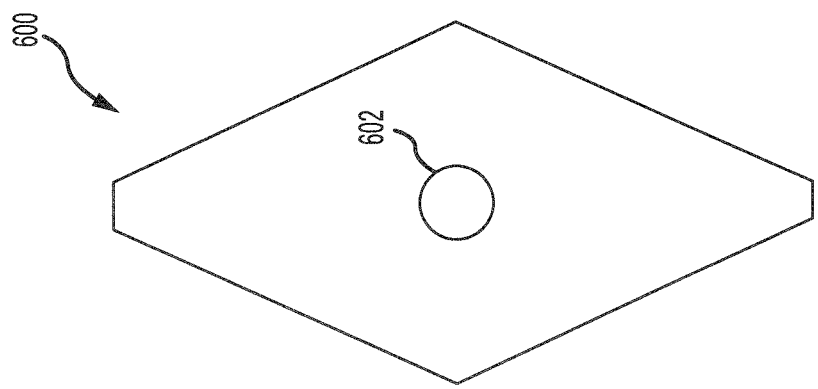

In various embodiments and with additional reference to FIG. 6, a septum 600 having features, geometries, construction, materials, manufacturing techniques, and/or internal components similar to septum 314 and septum 500 is illustrated in isolation. Septum 600 comprises a perforation 602. A mesh 604 is coupled to face 610 of septum 600 across perforation 602. In various embodiments, mesh 604 comprises a metallic wire mesh, weave, or blanket of a metal, an alloy, a steel, a stainless steel, a titanium, a titanium alloy, a nickel alloy, an aluminum, or an aluminum alloy and may be coupled by welding, brazing, or bonding. In various embodiments mesh 604 may comprise a polymer wire mesh, weave, or blanket, of an aramid, a para-aramid, a polyether ether ketone and/or the like bonded to face 610.

Figure 7:
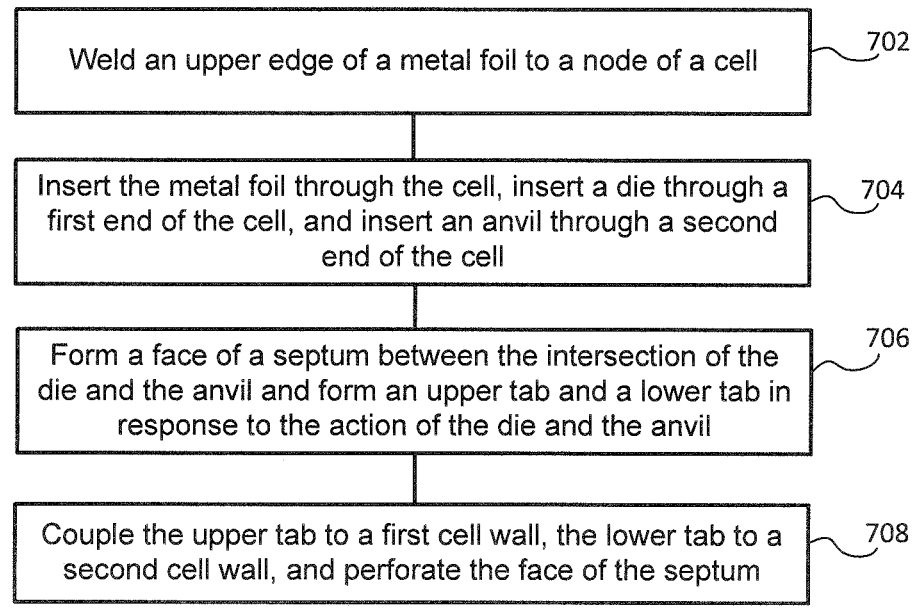
FIG. 7 illustrates a process flow for a method of manufacturing a panel for attenuating noise, in accordance with various embodiments.

In various embodiments and with reference to FIG. 7, a method 700 of manufacturing a panel for attenuating noise comprises laying an upper edge of a metal foil across an opening of a cell of a metallic cellular core and coupling the upper edge to a node of the cell at the opening (step 702). The method includes driving a lower edge of the metal foil through the cell, inserting a die through a first end of the cell, and inserting an anvil through a second end of the cell (step 704). Method 700 includes forming a face of a septum between the intersection of the die and the anvil and forming an upper tab and a lower tab in response to the action of the die and the anvil (step 706). In various embodiments, method 700 includes coupling the upper tab to a first cell wall of the cell and coupling the lower tab to a second cell wall of the cell and perforating the face of the septum (step 708). Method 700 may include coupling a face skin to the cellular core at the first end of the cell, perforating the face skin, and coupling a base skin to the cellular core at the second end of the cell.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A panel for attenuating noise comprising:
   a face skin;
   a base skin;
   a cellular core connected to and forming a plurality of cells between the face skin and the base skin, wherein the cellular core is defined by a cell structure having a plurality of cell walls extending between the face skin and the base skin defining each of the plurality of cells; and
   a septum disposed within each of the plurality of cells, the septum defining a first chamber proximate the face skin and a second chamber proximate the base skin, the septum continuously slanted to define a plane intersecting the face skin and the base skin at a non-orthogonal angle, wherein the face skin comprises a plurality of perforations fully through the face skin and in fluid communication with the first chamber, wherein the septum comprises a metal foil slanted between 15° and 60° relative to the face skin to attenuate a gas path noise via Helmholtz resonance.

2. The panel of claim 1, wherein the septum comprises a perforation through a face having a perforated area, wherein the first chamber and the second chamber are in fluid communication via the perforation, and wherein the metal foil comprising the septum extends from within the first chamber into an adjacent first chamber of an adjacent cell of the plurality of cells.

3. The panel of claim 2, wherein the cell structure is at least one of hexagonal, pentagonal, triangular, circular, oblate, oval, elliptical, or lenticular.

4. The panel of claim 2, wherein the perforated area is between 1% and 25% of the face.

5. The panel of claim 4, wherein the cell structure is a quadrilateral cell structure defining a cell having a first cell wall, a second cell wall, a third cell wall, and a fourth cell wall each cell wall defining nodes at the intersections thereof, wherein the septum extends across the cell from a node at a first inner surface to an opposing node at a second inner surface.

6. The panel of claim 5, wherein the septum comprises a steel, a stainless steel, a titanium, a titanium alloy, a nickel alloy, an aluminum, or an aluminum alloy.

7. The panel of claim 6, wherein the metal foil comprises a first upper tab, a second upper tab, a first lower tab, and a second lower tab.

8. The panel of claim 7, wherein the first upper tab is coupled to the first cell wall, the second upper tab is coupled to the second cell wall, the first lower tab is coupled to the third cell wall, and the second lower tab is coupled to the fourth cell wall.

9. The panel of claim 2, further comprising a mesh coupled to the face across the perforation.

10. A gas turbine engine comprising:
a compressor section configured to compress a gas;
a combustor section aft of the compressor section and configured to combust the gas;
a turbine section aft of the combustor section configured to drive the compressor section; and
a panel for attenuating noise, wherein the panel comprises:
a face skin having a first inner surface;
a base skin having a second inner surface;
a cellular core connected to and forming a plurality of cells between the face skin and the base skin, wherein the cellular core is defined by a cell structure having a plurality of cell walls extending between the face skin and the base skin defining each of the plurality of cells; and
a septum disposed within each of the plurality of cells, the septum defining an first chamber proximate the face skin and a second chamber proximate the base skin, the septum continuously slanted to define a plane intersecting the face skin and the base skin at a non-orthogonal angle, wherein the face skin comprises a plurality of perforations fully through the face skin and in fluid communication with the first chamber, wherein the septum comprises a metal foil slanted between 15° and 60° relative to the face skin to attenuate a gas path noise via Helmholtz resonance.

11. The gas turbine engine of claim 10, wherein the septum comprises a perforation through a face having a perforated area, wherein the first chamber and the second chamber are in fluid communication via the perforation, and wherein the metal foil comprising the septum extends from within the first chamber into an adjacent first chamber of an adjacent cell of the plurality of cells.

12. The gas turbine engine of claim 11, wherein the cell structure is at least one of hexagonal, pentagonal, triangular, circular, oblate, oval, elliptical, or lenticular.

13. The gas turbine engine of claim 11, wherein the perforated area is between 1% and 25% of the face.

14. The gas turbine engine of claim 13, wherein the cell structure is a quadrilateral cell structure defining a cell having a first cell wall, a second cell wall, a third cell wall, and a fourth cell wall each defining nodes at the intersections thereof, wherein the septum extends across the cell from a node at the first inner surface to an opposing node at the second inner surface.

15. The gas turbine engine of claim 14, wherein the septum comprises a steel, a stainless steel, a titanium, a titanium alloy, a nickel alloy, an aluminum, or an aluminum alloy.

16. The gas turbine engine of claim 15, wherein the metal foil comprises a first upper tab, a second upper tab, a first lower tab, and a second lower tab.

17. The gas turbine engine of claim 16, wherein the first upper tab is coupled to the first cell wall, the second upper tab is coupled to the second cell wall, the first lower tab is coupled to the third cell wall, and the second lower tab is coupled to the fourth cell wall.

18. The gas turbine engine of claim 11, further comprising a mesh coupled to the face across the perforation.

19. A method of manufacturing a panel for attenuating noise comprising:
laying a first edge of a metal foil across an opening of a cell of a cellular core;
coupling the first edge to a node of the cell at the opening;
driving a second edge of the metal foil through the cell;
inserting a die through a first end of the cell and an anvil through a second end of the cell;
forming a face of a septum comprising the metal foil between the intersection of the die and the anvil, wherein the septum is slanted between 15° and 60° relative to a face skin to attenuate a gas path noise via Helmholtz resonance; and
forming an upper tab and a lower tab in response to the action of the die and the anvil.

20. The method of claim 19 further comprising:
coupling the upper tab to a first cell wall of the cell and coupling the lower tab to a second cell wall of the cell;
perforating the face of the septum; and
coupling the face skin to the cellular core at the first end of the cell, perforating the face skin, and coupling a base skin to the cellular core at the second end of the cell.

* * * * *